US009311939B1

(12) United States Patent  
Malina et al.

(10) Patent No.: US 9,311,939 B1  
(45) Date of Patent: Apr. 12, 2016

(54) WRITE-THROUGH MEDIA CACHING

(71) Applicant: Western Digital Technologies, Inc., Irvine, CA (US)

(72) Inventors: James N. Malina, Irvine, CA (US); Bill Phuc Tran, Corona, CA (US); Aznizam Abdullah Salehudin, Bandar Baru Bangi (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/582,025

(22) Filed: Dec. 23, 2014

(51) Int. Cl.  
*G11B 21/02* (2006.01)  
*G11B 5/596* (2006.01)  
*G11B 20/18* (2006.01)

(52) U.S. Cl.  
CPC ............ *G11B 5/596* (2013.01); *G11B 5/59688* (2013.01); *G11B 5/59694* (2013.01); *G11B 20/1889* (2013.01)

(58) Field of Classification Search  
None  
See application file for complete search history.

(56) References Cited

U.S. PATENT DOCUMENTS

| | | | |
|---|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |

(Continued)

OTHER PUBLICATIONS

Karl L. Enarson, et al., U.S. Appl. No. 13/952,768, filed Jul. 29, 2013, 33 pages.

*Primary Examiner* — Tan X Dinh

(57) ABSTRACT

Write-through media caching for a Data Storage Device (DSD) including at least one disk for storing data. A write command is received for storing data in the DSD and the data is written for the write command in a first region of the at least one disk with a first track density. The data for the write command is also written in a second region of the at least one disk with a second track density greater than the first track density without reading the data for the write command from the first region.

22 Claims, 4 Drawing Sheets

(56) References Cited

U.S. PATENT DOCUMENTS

| | | |
|---|---|---|
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,042 B1 * | 6/2002 | Paterson et al. .............. 711/112 |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |

(56) References Cited

U.S. PATENT DOCUMENTS

| | | |
|---|---|---|
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |

(56) References Cited

U.S. PATENT DOCUMENTS

| | | |
|---|---|---|
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,325,434 B2 * | 12/2012 | Namkoong et al. ............ 360/48 |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 * | 12/2013 | Tsai ............................ 714/6.13 |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,964,320 B1 | 2/2015 | Hu |
| 9,111,578 B1 * | 8/2015 | Hassel ............... G11B 20/1217 |
| 2002/0036852 A1 * | 3/2002 | Leow et al. ..................... 360/31 |
| 2003/0112692 A1 * | 6/2003 | Gonzalez et al. ........ 365/230.03 |
| 2006/0227445 A1 | 10/2006 | Chiao |
| 2008/0002272 A1 * | 1/2008 | Riedel ............................ 360/55 |
| 2009/0113702 A1 | 5/2009 | Hogg |
| 2009/0190251 A1 * | 7/2009 | Yokohata et al. .......... 360/78.01 |
| 2010/0306551 A1 | 12/2010 | Meyer et al. |
| 2011/0055664 A1 * | 3/2011 | Burd et al. .................... 714/768 |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0031406 A1 * | 1/2013 | Cho ............................... 714/6.1 |
| 2013/0242425 A1 * | 9/2013 | Zayas et al. ..................... 360/15 |
| 2014/0201424 A1 | 7/2014 | Chen et al. |
| 2015/0109700 A1 * | 4/2015 | Kashiwase ......... G11B 5/59627 360/77.04 |

* cited by examiner

WRITE-THROUGH MEDIA CACHING

BACKGROUND

Data Storage Devices (DSDs) are often used to record data on or to reproduce data from a recording media. As one type of DSD, a disk drive can include a rotating magnetic disk and a head actuated over the disk to magnetically write data to and read data from the disk. Such disks include a plurality of radially spaced, concentric tracks for recording data.

Shingled Magnetic Recording (SMR) has been introduced as a way of increasing the amount of data that can be stored in a given area on a disk by increasing the number of Tracks Per Inch (TPI). SMR increases TPI by using a relatively wide shingle write head to overlap tracks like roof shingles. The non-overlapping portion then serves as a narrow track that can be read by a narrower read head.

Although a higher number of TPI is ordinarily possible with SMR, the higher track density can create additional problems. For example, the closer spacing of tracks in an SMR region can worsen Adjacent Track Interference (ATI) where the writing of data on an adjacent track negatively affects the data written on a target track.

Another problem encountered with SMR involves Wide Area Track Erasure (WATER). WATER results in data being erased from adjacent tracks near a track being written due to interference from the magnetic field of the write head. DSDs using SMR are ordinarily more susceptible to WATER than conventional disk drives due to the combination of narrower tracks and a wider shingle write head having a stronger magnetic field. In addition, the closer spacing of tracks can also make writing data more susceptible to errors when writing due to vibration or mechanical shock.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
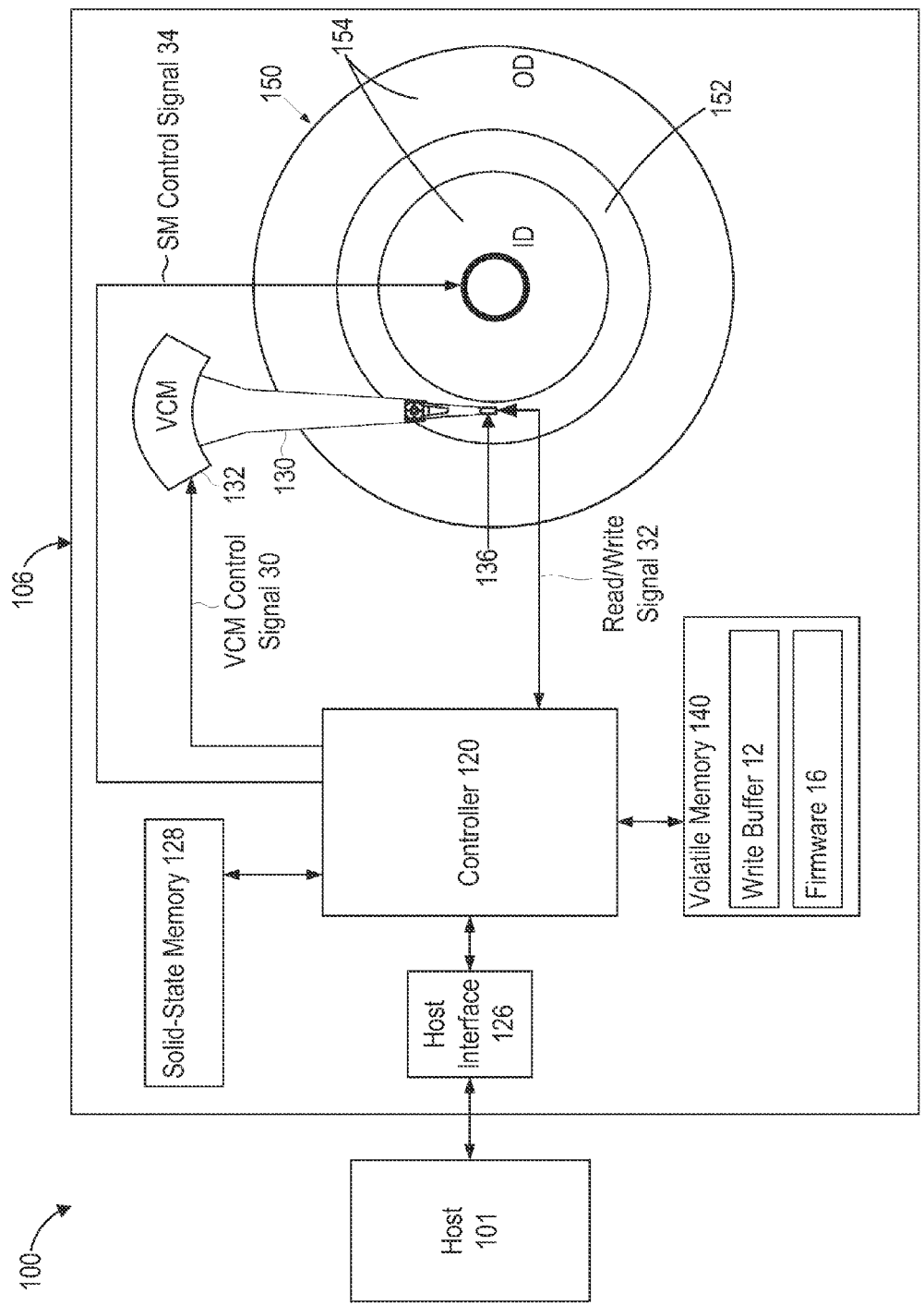
FIG. 1 is a block diagram depicting a Data Storage Device (DSD) according to an embodiment.

FIG. 1 shows system 100 according to an embodiment that includes host 101 and Data Storage Device (DSD) 106. System 100 can be, for example, a computer system (e.g., server, desktop, mobile/laptop, tablet, smartphone, etc.) or other electronic device such as a digital video recorder (DVR). In this regard, system 100 may be a stand-alone system or part of a network. Those of ordinary skill in the art will appreciate that system 100 and DSD 106 can include more or less than those elements shown in FIG. 1 and that the disclosed processes can be implemented in other environments.

In the example embodiment of FIG. 1, DSD 106 includes both solid-state memory 128 and disk 150 for storing data. In this regard, DSD 106 can be considered a Solid-State Hybrid Drive (SSHD) in that it includes both solid-state Non-Volatile Memory (NVM) media and disk NVM media. In other embodiments, each of disk 150 or solid-state memory 128 may be replaced by multiple Hard Disk Drives (HDDs) or multiple Solid-State Drives (SSDs), respectively, so that DSD 106 includes pools of HDDs or SSDs. In yet other embodiments, DSD 106 may include disk 150 without solid-state memory 128.

DSD 106 includes controller 120 which comprises circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

In the example of FIG. 1, disk 150 is rotated by a spindle motor (not shown). DSD 106 also includes head 136 connected to the distal end of actuator 130, which is rotated by Voice Coil Motor (VCM) 132 to position head 136 in relation to disk 150. Controller 120 can control the position of head 136 and the rotation of disk 150 using VCM control signal 30 and SM control signal 34, respectively. In this regard, controller 120 includes servo controller circuitry for controlling the position of head 136 and the rotation of disk 150.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks (not shown) for storing data on a surface of disk 150. The tracks on disk 150 may be grouped together into zones of tracks with each track divided into a number of sectors that are spaced circumferentially along the tracks.

As shown in the example of FIG. 1, disk 150 includes first region 152 with a first track density and second region 154 with a second track density greater than the first track density. The first track density in first region 152 is less than the second track density in that the centers of tracks in second region 154 are closer together and can store more data in a given area of disk 150. In some implementations, second region 154 may be written using Shingled Magnetic Recording (SMR) such that the tracks in second region 154 overlap, while first region 152 can be written using Conventional Magnetic Recording (CMR) such that the tracks in first region 152 do not overlap. In other implementations, the tracks in both first region 152 and second region 154 may be written using SMR or CMR, but with a higher track density in second region 154.

The example embodiment of FIG. 1 depicts first region 152 in a Middle Diameter (MD) portion of disk 150. In this regard, first region 152 with a lower track density may be located in an MD portion since locating a higher track density region in other portions of disk 150, such as an Outer Diameter (OD) or Inner Diameter (ID) portion, can result in an increased data capacity than locating the higher track density region in an MD portion. In other embodiments, first region 152 and second region 154 may be located in other portions of disk 150 or may have different relative areas on disk 150.

First region 152 or second region 154 may be contiguous regions or may be non-contiguous regions as in the example of FIG. 1, where second region 154 is located on both sides of first region 152. In addition, disk 150 is shown in FIG. 1 as having two regions with different track densities, however, other embodiments may include a different number of regions with different track densities.

In addition to disk 150, the NVM media of DSD 106 also includes solid-state memory 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

In FIG. 1, volatile memory 140 can include, for example, a Dynamic Random Access Memory (DRAM), which can be used by DSD 106 to temporarily store data. Data stored in volatile memory 140 can include data read from NVM media (e.g., disk 150 or solid-state memory 128) or data to be written to NVM media. As shown in FIG. 1, volatile memory 140 includes write buffer 12 for temporarily storing data to be written to disk 150. In other embodiments, write buffer 12 may be stored in other locations such as in solid-state memory 128.

Volatile memory 140 can also store instructions loaded from firmware 16 for execution by controller 120 or data used in executing firmware 16. In this regard, volatile memory 140 in FIG. 1 is shown as temporarily storing firmware 16 which can include instructions for execution by controller 120 to implement the write through caching processes discussed below. Firmware 16 may be stored in one of the non-volatile storage media shown in FIG. 1 such as solid-state memory 128 and/or rotating magnetic media including disk 150.

In operation, host interface 126 receives read and write commands from host 101 via host interface 126 for reading data from and writing data to the NVM media of DSD 106. In response to a write command from host 101, controller 120 may buffer the data to be written for the write command in volatile memory 140.

For data to be stored in solid-state memory 128, controller 120 receives data from host interface 126 and may buffer the data in a write buffer of volatile memory 140. In one implementation, the data is then encoded into charge values for charging cells (not shown) of solid-state memory 128 to store the data.

In response to a read command for data stored in solid-state memory 128, controller 120 in one implementation reads current values for cells in solid-state memory 128 and decodes the current values into data that can be transferred to host 101. Such data may be buffered by controller 120 in a read buffer of volatile memory 140 before transferring the data to host 101 via host interface 126.

In response to a read command for data stored on disk 150, controller 120 positions head 136 via VCM control signal 30 to magnetically read the data stored on the surface of disk 150. Head 136 sends the read data as read signal 32 to controller 120 for decoding, and the data can be buffered in a read buffer of volatile memory 140 for transferring to host 101.

For data to be written to disk 150, controller 120 can encode data buffered in write buffer 12 into write signal 32 which is provided to head 136 for magnetically writing data to the surface of disk 150. As discussed in more detail below, the write through caching of the present disclosure can include writing the data for the write command in first region 152 and then writing the data for the write command in second region 154 without reading the data for the write command from first region 152. In this regard, first region 152 with its lower track density is used as a write through media cache on disk 150.

Since second region 154 has a higher track density, it is more susceptible than first region 152 to errors caused by vibration, shock, Adjacent Track Interference (ATI), Wide Area Track Erasure (WATER), or adjacent track encroachment issues due to the close proximity of tracks. By writing data in a more protected first region 152 before writing the data in a less protected second region 154, data can ordinarily be safely stored on disk 150 while still allowing for the data capacity savings of second region 154 with its higher track density.

In addition, the disk media caching discussed below is "write through" in that writing data to second region 154 is not deferred. In more detail, data can be written directly from write buffer 12 to second region 154 without having to read the data from first region 152. In contrast to other disk caching where writing data a second time on the disk is deferred, the write through caching of the present disclosure can reduce the overall amount of disk operations since data does not need to be read from first region 152 (i.e., the disk media cache) to write the data in second region 154 from write buffer 12. This can ordinarily allow for a lower overall power consumption and lower wear on head 136 since a read operation does not need to be performed in first region 152 to write the data in second region 154. An overall performance time for storing data in both first region 152 and second region 154 is also usually less since accessing data from write buffer 12 is generally quicker than reading data from first region 152.

The write through caching discussed below also allows for a more steady and predictable performance cost in terms of performing garbage collection and defragmentation in first region 152. Since data is written in second region 154 without being deferred, the first copy of the data in first region 152 can typically be overwritten sooner because a copy of the data is ordinarily available sooner in second region 154. In write caching where writing the second time to the disk is deferred, defragmentation and garbage collection may also end up being deferred until the amount of invalid data or fragmentation in the disk media cache reaches a critical level. At that point, other commands may be delayed for a longer period of time in order to perform garbage collection or defragmentation, which may also occur at an inconvenient time with respect to the performance of DSD 106.

Track Examples for First Region and Second Region

Figure 2A:
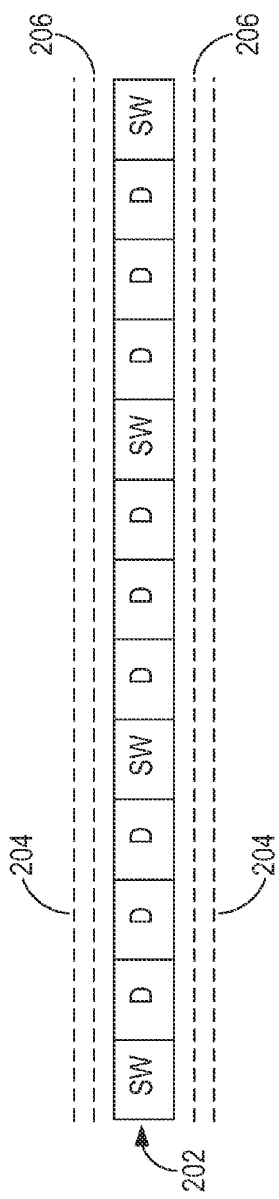
FIG. 2A is a conceptual diagram illustrating a track with a lower servo bandwidth and a lower margin of allowable deviation according to an embodiment.
Figure 2B:
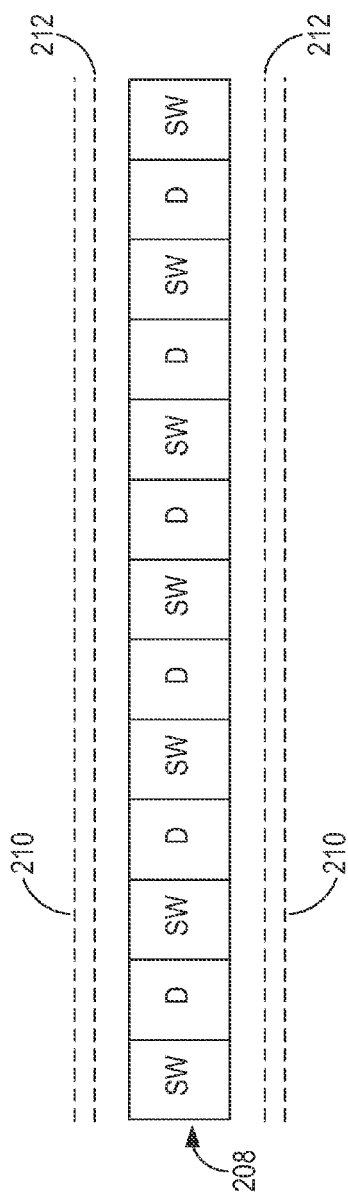
FIG. 2B is a conceptual diagram illustrating a track with a higher servo bandwidth and a greater margin of allowable deviation according to an embodiment.

FIGS. 2A and 2B illustrate example tracks from each of first region 152 and second region 154, respectively, to compare differences between the regions. In FIG. 2A, track 202 of first region 152 includes servo wedges spaced every four sectors as indicated by the servo wedge sectors with "SW" and user data sectors indicated with a "D." Each servo wedge may include servo information that can be read from disk 150 by head 136 to determine the position of head 136 over disk 150. For example, each servo wedge may include a pattern of alternating magnetic transitions (servo burst), which may indicate a particular wedge number on disk 150.

The spacing of the servo wedges in track 202 may be slightly different than for other tracks in first region 152 due to differences in the radial location of the tracks. Although the physical spacing of the servo wedges may vary slightly among tracks within first region 152, the frequency at which the servo wedges are read by head 136 during an operation of head 136 (e.g., reading or writing data in first region 152), is approximately the same throughout first region 152 to provide a substantially uniform servo bandwidth in first region 152. As used herein, a servo bandwidth refers to the frequency at which servo wedges are read by head 136 during an operation of head 136.

FIG. 2A also depicts write unsafe limit 204 and predicted write unsafe limit 206 with dashed lines. Write unsafe limit 204 provides a margin of an allowable deviation from the center of track 202 when writing data. If head 136 travels outside of write unsafe limit 204 while writing data, head 136 will stop writing data and treat the write as a write error. Such deviation from track 202 may occur, for example, during a vibration condition of DSD 106 (e.g., speakers of system 100 creating a significant amount of vibration) or during a mechanical shock event of DSD 106 (e.g., when system 100 is bumped). To reduce future write errors, DSD 106 may also use predicted write unsafe limit 206 to trigger a corrective action to reposition head 136 closer to the center of track 202.

In comparison to track 202 of FIG. 2A, track 208 depicted in FIG. 2B is a wider track, has a higher servo bandwidth, and a larger margin of allowable deviation from the center of track 208. As shown in FIG. 2B, servo wedges are spaced at every other sector in track 208 rather than at every fourth sector. The closer spacing of servo wedges provide a higher servo bandwidth in first region 152 so that servo wedges are read more frequently by head 136 when performing an operation in first region 152 than in second region 154. The higher servo bandwidth of first region 152 ordinarily allows for better control of head 136 since position information is available more frequently.

As will be appreciated by those of ordinary skill in the art, the foregoing examples of servo wedge spacing in tracks 202 and 208 are used to illustrate a difference in servo bandwidth. Actual servo wedge spacing may differ from those shown in FIGS. 2A and 2B.

In addition, track 208 includes a wider or larger margin of allowable deviation from the center of track 208 when compared to track 202 of FIG. 1. This is illustrated in FIG. 2B with write unsafe limit 210 and predicted write unsafe limit 212 being spaced farther from the center of track 208 when compared to the limits shown in FIG. 2A for track 202. Track 208 can have a larger margin of allowable deviation due to the lower track density in first region 152, which can result from one or both of having wider tracks and a wider spacing between tracks.

As a result of one or both of the higher servo bandwidth and the larger margin of allowable deviation in first region 152, head 136 can ordinarily write without errors during vibration or shock conditions that would otherwise cause errors in the higher track density region of second region 154.

Example Write Through Caching Process

Figure 3:
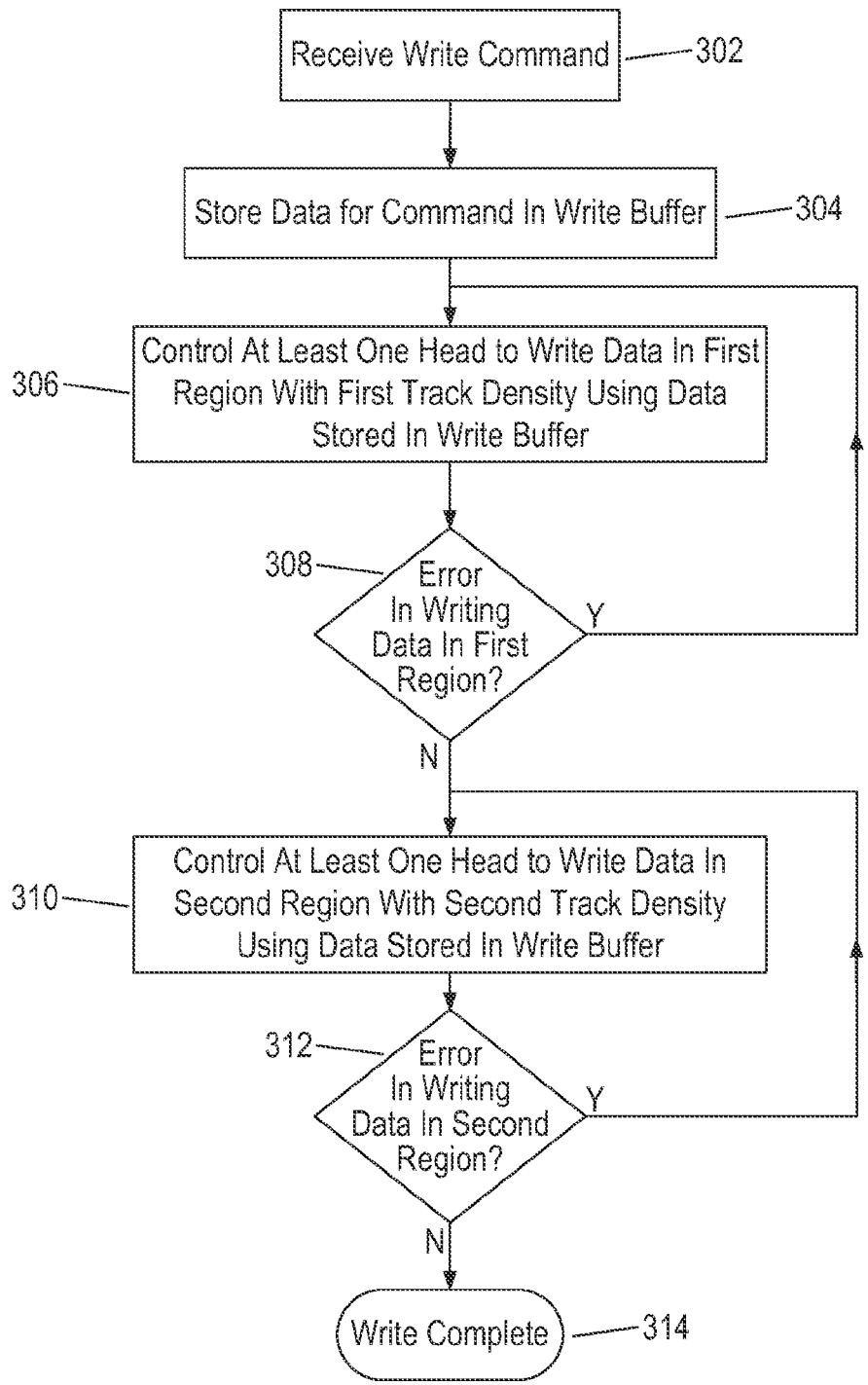
FIG. 3 is a flowchart for a write through media caching process according to an embodiment.

FIG. 3 is a flowchart for a write caching process that can be performed by controller 120 executing firmware 16 according to an embodiment. In block 302, controller 120 receives a write command from host 101 via host interface 126. The write command can include data to be stored in DSD 106 and may or may not specify a location in DSD 106 for storing the data.

In block 304, controller 120 temporarily stores the data for the write command in write buffer 12 of volatile memory 140. In block 306, controller 120 controls head 136 to write the data for the write command from write buffer 12 to first region 152 with a first track density that is less than a second track density of second region 154.

In block 308, controller 120 determines whether there was an error in writing the data in first region 152. This may occur, for example, if head 136 travels outside of write unsafe limit 210. In some implementations, controller 120 may perform a write verify operation in block 308 to read the data written in first region 152 and verify that the data can be accessed from first region 152.

If there was an error in writing the data in first region 152, controller 120 rewrites the data from the command in first region 152 by returning to block 306. The servo bandwidth and/or the margin of allowable deviation in first region 152 can be set so that write errors occur less frequently in first region 152 than in second region 154 for a given vibration or shock condition of DSD 106. Accordingly, errors in first region 152 are ordinarily expected less than in second region 154 and first region 152 can be used as a safer or more protected portion of disk 150 for performing the initial writing or caching of data on disk 150.

In this regard, a data capacity size of first region 152 can be based on a predetermined amount of time for writing data in first region 152 when writing the data would not be possible in second region 154 due to an environmental condition such as vibration or shock. For example, first region 152 may be sized so that it can store a certain amount of data that corresponds to a predetermined time that second region 154 is unavailable. In such a case, data could continue to be written in first region 152 until it becomes full, thereby providing time for the environmental condition to end.

In other implementations, first region 152 may be sized based on the size of write buffer 12. In one such implementation, a data capacity size of first region 152 is approximately equal to a data capacity size of write buffer 12. This can ordinarily allow for substantially all of the data stored in write buffer 12 to be written to first region 152 while limiting the storage capacity cost of first region 152 to the overall storage capacity of disk 150. In other words, since first region 152 has a lower track density than second region 154, disk 150 can accommodate more data by limiting the size of first region 152 to a smaller area on disk 150. By sizing first region 152 to approximately the same size as write buffer 12, first region 152 does not have to be overwritten to store all of the data from write buffer 12 without consuming extra space on disk 150.

Returning to FIG. 3, if no error occurs in writing the data in first region 152, controller 120 in block 310 controls head 136 to write the data from write buffer 12 in second region 154. As discussed above, such write through caching where data is directly provided from write buffer 12 typically avoids having to read the data from first region 152 as in a deferred caching process. As a result, a lifetime expectancy of head 136 is typically longer, an overall power consumption of DSD 106 is typically less, and an overall performance time for writing data in both regions is typically less. In addition, and as discussed above, maintenance operations in first region 152 are generally more predictable by not deferring the second write to disk 150.

In block 312, controller 120 determines whether there was an error in writing the data in second region 154. This may occur, for example, if head 136 travels outside of write unsafe limit 204 in FIG. 2A. In some implementations, controller 120 may perform a write verify operation in block 312 to read the data written in second region 154 and verify that the data can be accessed from second region 154.

If it is determined that there was an error in writing data in second region 154, controller 120 returns to block 310 to rewrite the data in second region 154. On the other hand, if there was no error in block 312, the process of FIG. 3 ends in block 314.

Selectively Applying the Write Through Caching Process

In one embodiment, the write through caching is selectively applied to an incoming data workload. One selection factor involves steering sequential writes to the write through caching mode. In one embodiment, the detection of sequential writes involves detecting when a certain number of sequential data blocks (e.g., 64) is encountered. This may be part of an automation handling in the data storage device. In one example, when this occurs, automation is used to handle the write commands to speed up operation, and as part of the automation trigger, the write through caching mode can be activated.

An aggregator may be used in the detection. In one embodiment, there are other conditions indicative of random writes (e.g., host not sending data in several revolutions of the disk, not enough sequential count, etc.) that the aggregator looks for in making the determination. So, for example, if the host provides a small sequential sequence of write commands and invalidates it, write through would not be enabled. The aggregator may be run-time configurable. This may be helpful in improving write-all applications, video stream writing applications, drive duplicator applications, back-up applications, or any applications in which large sequential writes may be involved.

Figure 4:
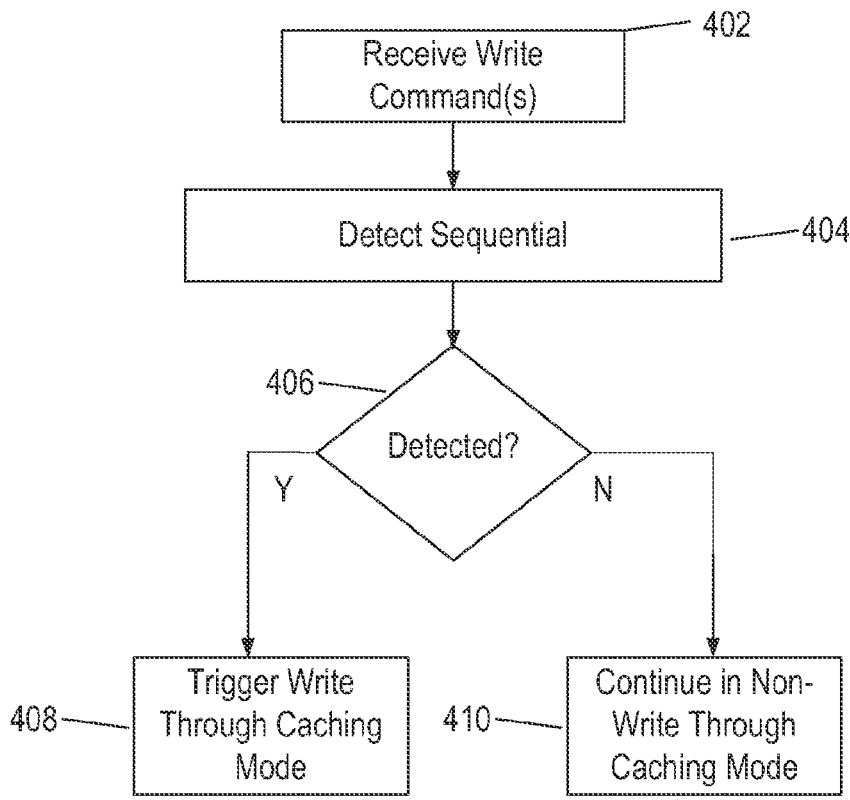
FIG. 4 is a flowchart for a determining when to activate a write through media caching process according to an embodiment.

FIG. 4 is a flowchart for selectively determining the activation of a write through caching process that can be performed by controller 120 executing firmware 16 according to an embodiment. In block 402, write commands are received. In block 404, a detection process (e.g., an aggregator with configurable options) can be applied to monitor the incoming stream of write commands to detect sequential writes, as discussed above. If detected at block 406, write through caching mode is triggered at block 408. Otherwise, at block 410, the controller continues to process write commands in a non-write through caching mode. This means that the controller may write data to a first region, and later read the same data from the first region and write the read data to a second region with a higher track density.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   at least one disk for storing data, the at least one disk including a first region and a second region;
   at least one head for writing data in tracks on the at least one disk; and
   a controller configured to:

receive a write command for storing data in the DSD;
control the at least one head to write the data for the write command in the first region with a first track density using a first margin of allowable deviation from a center of a target track in the first region; and
control the at least one head to write the same data for the same write command in the second region with a second track density greater than the first track density using a second margin of allowable deviation from a center of a target track in the second region and without reading the data for the write command from the first region, wherein the second margin of allowable deviation is less than the first margin of allowable deviation.

2. The DSD of claim 1, wherein the first region and the second region include servo wedges for positioning the at least one head, and wherein the servo wedges are arranged in the first region so that they are read by the at least one head more frequently than the servo wedges in the second region during an operation of the at least one head.

3. The DSD of claim 1, wherein the controller is further configured to:
determine whether there was an error in writing the data for the write command in the first region;
if there was an error in writing the data for the write command in the first region, control the at least one head to rewrite the data for the write command in the first region with the first track density; and
if there was not an error in writing the data for the write command in the first region, control the at least one head to write the data for the write command in the second region with the second track density.

4. The DSD of claim 1, wherein the controller is further configured to:
determine whether there was an error in writing the data for the write command in the second region; and
if there was an error in writing the data for the write command in the second region, control the at least one head to rewrite the data for the command in the second region with the second track density.

5. The DSD of claim 1, further comprising a volatile memory for buffering the data for the write command, and wherein the controller is further configured to:
store the data for the write command in a write buffer of the volatile memory; and
control the at least one head to write the data for the write command in the first region and the second region using the data stored in the write buffer of the volatile memory.

6. The DSD of claim 5, wherein a data capacity size of the first region is approximately equal to a data capacity size for the write buffer of the volatile memory.

7. The DSD of claim 1, wherein the controller is further configured to control the at least one head to write the data for the write command in the second region in overlapping tracks.

8. The DSD of claim 7, wherein the controller is further configured to control the at least one head to write the data for the write command in the first region in overlapping tracks.

9. The DSD of claim 1, wherein a data capacity size of the first region is based on a predetermined amount of time for writing the data for the write command in the first region when writing the data for the write command in the second region would not be possible due to an environmental condition.

10. The DSD of claim 1, wherein the controller is further configured to:
receive a plurality of write commands including the write command;
detect a sequentiality of the write commands; and
upon detection of the sequentiality of the write commands, perform the control of the at least one head to write the data for the write command in the first region with a first track density and the control of the at least one head to write the same data for the same write command in the second region with a second track density greater than the first track density and without reading the data for the write command from the first region.

11. A method for storing data in a Data Storage Device (DSD) including at least one disk with a first region and a second region, the method comprising:
receiving a write command for storing data in the DSD;
writing the data for the write command in the first region with a first track density using a first margin of allowable deviation from a center of a target track in the first region; and
writing the same data for the same write command in the second region with a second track density greater than the first track density using a second margin of allowable deviation from a center of a target track in the second region and without reading the data for the write command from the first region, wherein the second margin of allowable deviation is less than the first margin of allowable deviation.

12. The method of claim 11, wherein the first region and the second region include servo wedges for positioning at least one head of the DSD, and wherein the servo wedges are arranged in the first region so that they are read by the at least one head more frequently than the servo wedges in the second region during an operation of the at least one head.

13. The method of claim 11, further comprising:
determining whether there was an error in writing the data for the write command in the first region;
if there was an error in writing the data for the write command in the first region, rewriting the data for the write command in the first region with the first track density; and
if there was not an error in writing the data for the write command in the first region, writing the data for the write command in the second region with the second track density.

14. The method of claim 11, further comprising:
determining whether there was an error in writing the data for the write command in the second region; and
if there was an error in writing the data for the write command in the second region, rewriting the data for the command in the second region with the second track density.

15. The method of claim 11, wherein the DSD comprises a write buffer for buffering the data for the write command, and wherein the method further comprises:
storing the data for the write command in the write buffer; and
writing the data for the write command in the first region and the second region using the data stored in the write buffer.

16. The method of claim 15, wherein a data capacity size of the first region is approximately equal to a data capacity size for the write buffer.

17. The method of claim 11, further comprising writing the data for the write command in the second region in overlapping tracks.

18. The method of claim 17, further comprising writing the data for the write command in the first region in overlapping tracks.

19. The method of claim 11, wherein a data capacity size of the first region is based on a predetermined amount of time for writing the data for the write command in the first region when writing the data for the write command in the second region would not be possible due to an environmental condition.

20. The method of claim 11, further comprising:
receiving a plurality of write commands including the write command;
detecting a sequentiality of the write commands; and
upon detection of the sequentiality of the write commands, performing the controlling of the at least one head to write the data for the write command in the first region with a first track density and the controlling of the at least one head to write the same data for the same write command in the second region with a second track density greater than the first track density and without reading the data for the write command from the first region.

21. A non-transitory computer readable medium storing computer-executable instructions for storing data in a Data Storage Device (DSD) including at least one disk with a first region and a second region, wherein when the computer-executable instructions are executed by a controller, the computer-executable instructions cause the controller to:
receive a write command for storing data in the DSD;
write the data for the write command in the first region with a first track density using a first margin of allowable deviation from a center of a target track in the first region; and
write the same data for the same write command in the second region with a second track density greater than the first track density using a second margin of allowable deviation from a center of a target track in the second region and without reading the data for the write command from the first region, wherein the second margin of allowable deviation is less than the first margin of allowable deviation.

22. The non-transitory computer readable medium of claim 21, wherein the computer-executable instructions further comprise computer-executable instructions to cause the controller to:
receive a plurality of write commands including the write command;
detect a sequentiality of the write commands; and
upon detection of the sequentiality of the write commands, perform the control of the at least one head to write the data for the write command in the first region with a first track density and the control of the at least one head to write the same data for the same write command in the second region with a second track density greater than the first track density and without reading the data for the write command from the first region.

* * * * *